UNITED STATES PATENT OFFICE.

LAURENCE M. KLAUBER, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF SOLDERING METALS.

1,196,118. Specification of Letters Patent. Patented Aug. 29, 1916.

No Drawing. Application filed April 1, 1910. Serial No. 552,748.

*To all whom it may concern:*

Be it known that I, LAURENCE M. KLAUBER, a citizen of the United States, and a resident of Wilkinsburg, in the county of Allegheny and State of Pennsylvania, have invented a new and useful Improvement in Methods of Soldering Metals, of which the following is a specification.

My invention relates to methods of soldering metals and particularly to methods of soldering joints in aluminum wires and other conductors.

The object of my invention is to provide a simple and successful method of soldering aluminum which shall require a minimum expenditure of time and labor and insure a product of uniform excellence.

Great difficulty has heretofore been experienced in soldering aluminum on account of the great rapidity with which an oxid film is formed upon the surface of the metal. An oxid film prevents the solder from sticking and, so far as I am aware, aluminum has never been soldered with any degree of success without scratching or cleaning the surfaces while they were covered with molten solder. It is obvious that the aforesaid method cannot be employed for soldering joints in aluminum wires of small gage or for similar operations, and it is my aim to secure the result desired without employing any mechanical means for cleaning the conductor while it is immersed in the solder.

According to my present invention, I apply to the portion of the metal which is to be soldered by immersion or otherwise, a compound of mercury or a mixture containing mercury in order to attack the oxid film on the surface of the aluminum and to deposit metallic mercury thereon. The amalgamated or coated aluminum is then covered with, or preferably plunged into, molten solder which is held at a sufficiently high temperature to evaporate the mercury, thereby presenting a clean surface of aluminum to which the molten solder may adhere. The composition of the compound of mercury and the composition of the solder may be varied somewhat and an electric current may or may not be passed through the conductor and the amalgamating bath, within the spirit and scope of my invention, as hereinafter pointed out.

While I do not wish to be limited to any specific compound or mixture of mercury, I have found that the best results are secured by the use of a slightly acidified solution of mercuric chlorid ($HgCl_2$). Good results may also be secured by using metallic mercury and hydrochloric acid or a slightly acidulated solution of mercuric nitrate ($Hg(NO_3)_2$). It is also possible to solder aluminum by using a solution of mercuric oxid ($HgO$) in hydrochloric or nitric acid.

From the foregoing, it is evident that a solution of a mercury salt in water, if soluble, or in acid, if insoluble in water, or a mixture of any mercury compound which is capable of attacking the oxid film on the surface of the aluminum and of depositing mercury on the clean surface may be successfully employed in carrying out my invention. When once the clean aluminum is coated with mercury or amalgamated, it is only necessary to plunge it into or to cover it with molten solder, the temperature of which is sufficiently high to drive off the mercury; in order to produce a uniform coating of solder which strongly adheres to the surface of the aluminum.

The action of the compound or mixture of mercury on the aluminum may be somewhat hastened by passing an electric current from the solution into the aluminum conductor, the solution and the conductor being utilized as opposite terminals of an electric circuit.

I prefer to employ hydrochloric acid as an acidifying agent since I have found that other acids have a tendency to weaken the tensile strength of the aluminum under treatment. If the solution is strongly acidified, the action is more rapid and it is then only necessary to hold the aluminum in the solution a very short length of time; but, since it is only necessary, if the solution be at all acid, to keep the aluminum in the solution a few seconds, and, since the strongly acidified solution is more liable to injure the conductor, I consider the slightly acidified solution preferable. Metallic mercury may be placed in the vessel with the solution of mercuric chlorid, if desired, although I find no advantage in so doing when only small bodies of aluminum, such as small-gage wire, are being soldered.

While solder of any well known composition may be employed, somewhat more uniform results may be secured for very small aluminum wires when a solder composed of approximately 58% lead and 42% tin is employed. In joining wires of large size which may be subjected to mechanical strains, I prefer to use a solder having a small percentage of aluminum, for example: 69¼% tin, 24½% zinc and 6¼% aluminum, in order to avoid the tendency of the aluminum to alloy with the solder and thus weaken the joint.

It is particularly desirable to keep the temperature of the molten solder sufficiently high to quickly vaporize, or otherwise drive off, the mercury on the surface of the conductor when it is immersed therein.

Although I prefer to immerse the aluminum in the cleaning and amalgamating flux and to subsequently plunge the coated aluminum into a bath of molten solder, good results may be secured by applying the flux with a brush or otherwise, and by pouring the molten solder over the coated conductor. In fact, for small work, satisfactory results may be secured by the use of a soldering iron if care is taken to cover the coated portion with molten solder.

The method outlined above is not only applicable to aluminum, but may also be employed for soldering other metals and is particularly useful in soldering joints between aluminum and copper or other unlike metals, one of which is aluminum.

Since the use of aluminum wire commercially, is, to a great degree, dependent upon the ability to quickly and cheaply produce soldered joints, the importance of my invention is apparent.

I claim as my invention:

1. The method of soldering metals which consists in depositing a coating of mercury on one or both of the surfaces to be soldered and driving off the mercury by the application of molten solder thereto.

2. The method of soldering metals which consists in subjecting the surface to be soldered to a solution of a mercuric salt to form a coating of mercury thereon and then immersing the coated metal in molten solder.

3. The method of soldering metals which consists in immersing the surface to be soldered in an acidified solution of a mercuric salt to form a coating of mercury thereon and then immersing the amalgamated metal in molten solder.

4. The method of soldering metals which consists in subjecting the surface to be soldered to a solution of mercuric chlorid to form a coating of mercury thereon and then covering the coated metal with molten solder.

5. The method of soldering aluminum which consists in subjecting the surface to be soldered to an acidified solution of mercuric chlorid to form a coating of mercury thereon and applying molten solder to the coated surface at a sufficiently high temperature to drive off the mercury.

6. The method of soldering metals which consists in immersing the surface to be soldered in a slightly acidified solution of mercuric chlorid and then immersing the amalgamated metal in molten solder.

7. The method of soldering metals that consists in immersing the surface to be soldered in a solution of a mercuric salt, passing electric current through the metal and the solution to form a coating of mercury on the surface of the metal and subsequently immersing the coated surface of the metal in molten solder.

8. The method of soldering metals that consists in immersing the surface to be soldered in a solution of a mercuric salt, passing electric current through the metal and the solution to form a coating of mercury on the surface of the metal and subsequently immersing the coated surface in molten solder at a sufficiently high temperature to vaporize the mercury.

9. The method of soldering metals that consists in immersing the surface to be soldered in a solution of a mercuric salt, passing electric current through the metal and the solution to form a coating of mercury on the surface of the metal and subsequently immersing the amalgamated metal in molten solder containing a large percentage of tin and a small percentage of aluminum.

10. The method of soldering metals which consists in depositing a coating of mercury on the surface to be soldered and driving off the mercury by applying thereto molten solder at a sufficiently high temperature to vaporize the mercury.

11. The method of soldering metals which consists in depositing a coating of mercury on the surface to be soldered and driving off the mercury by applying a molten solder containing a large percentage of tin and a small percentage of aluminum.

12. The method of soldering metals that consists in subjecting the surfaces to be soldered to the action of an acidified mercuric salt in the presence of mercury to produce coatings thereon and then applying molten solder to the coated surfaces.

13. The method of soldering metals that consists in subjecting the surfaces to be soldered to the action of acidified mercuric chlorid in the presence of mercury to produce coatings thereon and then applying molten solder to the coated surfaces.

14. The method of soldering metals which consists in subjecting the surfaces to be soldered to an acidified solution of a mercuric salt to remove the oxid coatings and deposit coatings of mercury in place thereof and then immersing the amalgamated metal in molten solder.

In testimony whereof, I have hereunto subscribed my name this 30th day of March, 1910.

LAURENCE M. KLAUBER.

Witnesses:
J. McD. MASSIE, Jr.,
B. B. HINES.